(12) United States Patent
Lang et al.

(10) Patent No.: US 11,029,326 B2
(45) Date of Patent: Jun. 8, 2021

(54) AIRCRAFT AIRFLOW SENSOR PROBE AND PROCESS OF IMPLEMENTING AN AIRCRAFT SENSOR PROBE

(71) Applicant: Aerosonic Corporation, Clearwater, FL (US)

(72) Inventors: Charles Lang, Clearwater, FL (US); Edgard Schulz, Clearwater, FL (US); Jason Larkin, Clearwater, FL (US); Dwight Turner, Clearwater, FL (US)

(73) Assignee: Aerosonic Corporation, Clearwater, FL (US)

( * ) Notice: Subject to any disclaimer, the term of this patent is extended or adjusted under 35 U.S.C. 154(b) by 177 days.

(21) Appl. No.: 16/270,200

(22) Filed: Feb. 7, 2019

(65) Prior Publication Data

US 2019/0242924 A1    Aug. 8, 2019

Related U.S. Application Data

(60) Provisional application No. 62/627,259, filed on Feb. 7, 2018.

(51) Int. Cl.
*G01P 13/02* (2006.01)
*G01P 5/16* (2006.01)
*B64F 5/60* (2017.01)
*B64D 45/00* (2006.01)
*G01P 5/165* (2006.01)

(52) U.S. Cl.
CPC ............ *G01P 13/025* (2013.01); *B64D 45/00* (2013.01); *B64F 5/60* (2017.01); *G01P 5/16* (2013.01); *G01P 5/165* (2013.01); *B64D 2045/0085* (2013.01)

(58) Field of Classification Search
CPC .......... G01P 13/025; G01P 5/165; G01P 5/16; B64F 5/60; B64D 45/00
USPC ...................................... 73/170.02
See application file for complete search history.

(56) References Cited

U.S. PATENT DOCUMENTS

| 2,699,065 A | 1/1955 | Blair |
| 2,844,960 A * | 7/1958 | Staros ............... G01P 5/00 73/181 |
| 3,350,935 A | 11/1967 | Pitches et al. |
| 3,665,760 A * | 5/1972 | Pitches ............... B64D 43/02 73/170.09 |

(Continued)

OTHER PUBLICATIONS

International Search Report and Written Opinion issued in PCT/US19/17054, dated Apr. 30, 2019.

*Primary Examiner* — Tarun Sinha
(74) *Attorney, Agent, or Firm* — BakerHostetler

(57) ABSTRACT

An aircraft airflow sensor probe includes an airflow assembly or a cone assembly configured to sense a direction of local airflow outside an aircraft; a shaft configured to rotatably hold the assembly and allow rotational movement of the assembly; and a motor connected to the shaft and configured to generate a torque to damp the rotational movement of the shaft as well as the assembly. The sensor probe further includes an angle of attack processor configured to control the motor to generate the torque to damp the rotational movement of the shaft as well as the assembly and a sensor configured to sense a position of the assembly and provide the position of the assembly to the angle of attack processor. An aircraft airflow sensor process is disclosed as well.

20 Claims, 14 Drawing Sheets

(56) References Cited

U.S. PATENT DOCUMENTS 4,901,566 A 2/1990 Boetsch et al.
5,544,526 A 8/1996 Baltins et al.

* cited by examiner

AIRCRAFT AIRFLOW SENSOR PROBE AND PROCESS OF IMPLEMENTING AN AIRCRAFT SENSOR PROBE

CROSS REFERENCE TO PRIOR APPLICATIONS

This application claims the benefit of U.S. Provisional Application No. 62/627,259 filed on Feb. 7, 2018, which is hereby incorporated by reference in its entirety for all purposes as if fully set forth herein.

FIELD OF THE DISCLOSURE

The disclosure relates to an aircraft airflow sensor probe and a process of implementing an aircraft sensor probe. More particularly, the disclosure relates to an aircraft airflow sensor probe and a process of implementing an aircraft sensor probe having increased accuracy.

BACKGROUND OF THE DISCLOSURE

In typical implementations, an aircraft airflow sensor probe determines angle of attack by sensing a direction of local airflow with a vane assembly. The aircraft airflow sensor probe is typically mounted on a fuselage of an aircraft and extends through the aircraft fuselage. The angular position of the vane of the aircraft airflow sensor probe is converted to an electrical output by an angular sensor. The aircraft airflow sensor probe may be implemented as an angle of attack sensor, a stall warning transmitter, and/or the like.

However, it is been found that the movement of the vane within the airflow may be subjected to flutter or other airflow conditions that move or perturb the vane and prevent accurate airflow measurements. Some previous implementations have utilized a mechanical damping system to address this issue. However, such mechanical damping systems do not include any ability to adjust damping functionality and thus cannot modify damping operation based on ambient conditions and/or aircraft configurations. Moreover, the mechanical damping systems may be subjected to large changes in temperature (−100° F.-100° F.) during a flight of an aircraft that undesirably change damping functionality.

Accordingly, what is needed is an aircraft airflow sensor probe that is more accurate, less susceptible to airflow conditions that generate flutter, can adjust damping functionality, and the like.

SUMMARY OF THE DISCLOSURE

The foregoing needs are met, to a great extent, by the disclosure, wherein in one aspect a technique and apparatus are provided for an aircraft airflow sensor probe that is more accurate, less susceptible to airflow conditions that generate flutter, can adjust damping functionality, and the like.

In accordance with one aspect, an aircraft airflow sensor probe includes a vane assembly configured to sense a direction of local airflow outside an aircraft; a shaft configured to rotatably hold the vane assembly and allow rotational movement of the vane assembly; a motor connected to the shaft and configured to generate a torque to damp the rotational movement of the shaft as well as the vane assembly; an angle of attack processor configured to control the motor to generate the torque to damp the rotational movement of the shaft as well as the vane assembly; and a sensor configured to sense a position of the vane assembly and provide the position of the vane assembly to the angle of attack processor.

In accordance with one aspect, a process of operating an aircraft airflow sensor probe includes sensing a direction of local airflow outside an aircraft with a vane assembly; allowing rotational movement of the vane assembly with a shaft configured to rotatably hold the vane assembly; generating a torque to damp the rotational movement of the shaft as well as the vane assembly with a motor connected to the shaft; controlling the motor to generate the torque to damp the rotational movement of the shaft as well as the vane assembly with an angle of attack processor; and sensing a position of the vane assembly and providing the position of the vane assembly to the angle of attack processor with a sensor.

In accordance with one aspect, an aircraft airflow sensor probe includes a cone assembly configured to sense a direction of local airflow outside an aircraft; a shaft configured to rotatably hold the cone assembly and allow rotational movement of the cone assembly; a motor connected to the shaft and configured to generate a torque to damp the rotational movement of the shaft as well as the cone assembly; an angle of attack processor configured to control the motor to generate the torque to damp the rotational movement of the shaft as well as the cone assembly; and a sensor configured to sense a position of the cone assembly and provide the position of the cone assembly to the angle of attack processor.

In accordance with one aspect, a process of operating an aircraft airflow sensor probe includes sensing a direction of local airflow outside an aircraft with a cone assembly; allowing rotational movement of the cone assembly with a shaft configured to rotatably hold the cone assembly; generating a torque to damp the rotational movement of the shaft as well as the cone assembly with a motor connected to the shaft; controlling the motor to generate the torque to damp the rotational movement of the shaft as well as the cone assembly with an angle of attack processor; and sensing a position of the cone assembly and providing the position of the cone assembly to the angle of attack processor with a sensor.

There has thus been outlined, rather broadly, certain aspects of the disclosure in order that the detailed description thereof herein may be better understood, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
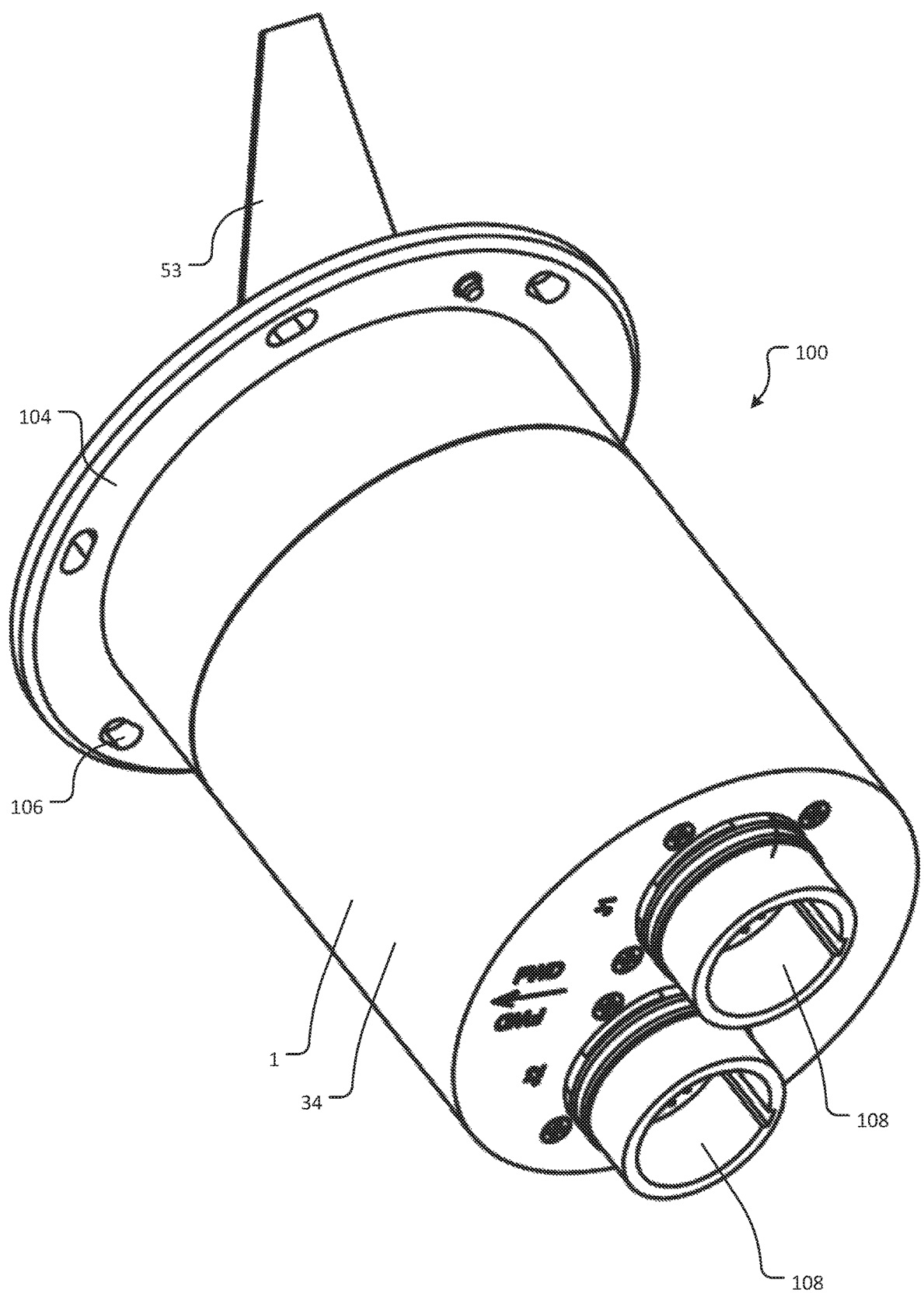
FIG. 1 illustrates a backside perspective view an aircraft airflow sensor probe according to the disclosure.

The disclosure will now be described with reference to the drawing figures, in which like reference numerals refer to like parts throughout. Aspects of the disclosure advantageously provide an aircraft airflow sensor probe that is more accurate, less susceptible to airflow conditions that generate flutter, can adjust damping functionality, and the like.

Figure 2:
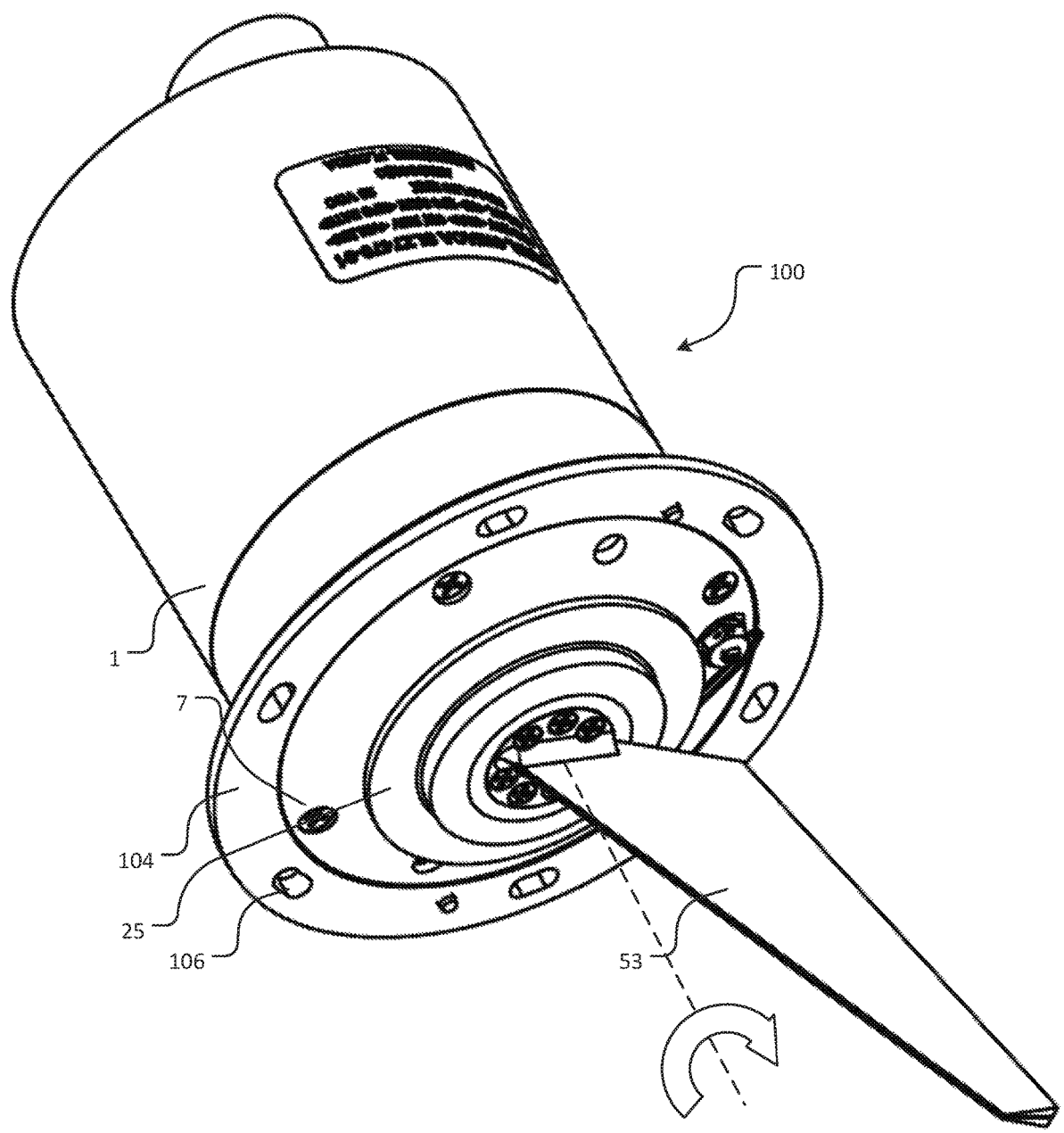
FIG. 2 illustrates a front side perspective view of the aircraft airflow sensor probe according to FIG. 1.

FIG. 1 illustrates a backside perspective view an aircraft airflow sensor probe according to the disclosure; and FIG. 2 illustrates a front side perspective view of the aircraft airflow sensor probe according to FIG. 1.

In particular, FIG. 1 and FIG. 2 illustrate an aircraft airflow sensor probe 100 configured as an angle of attack sensor to provide normalized angle of attack (AOA) information for flight control systems. In one aspect, the aircraft airflow sensor probe 100 may be configured as a Stall Warning Transmitter (SWT) to provide stall protection functionality for flight control systems. In some aspects, the Stall Warning Transmitter may be an angular position transmitter with an integrated stall warning computer.

In one aspect, the aircraft airflow sensor probe 100 may be a vane-type sensor. In one aspect, the aircraft airflow sensor probe 100 may be a forward-fuselage mounted sensor. In one aspect, the aircraft airflow sensor probe 100 may be electrically anti-iced. In one aspect, the aircraft airflow sensor probe 100 may be a vane-type, forward-fuselage mounted, electrically anti-iced, sensor. When mounted in the aircraft, the aircraft airflow sensor probe 100 may include a vane assembly 53 that extends perpendicular to the aircraft skin in order to sense the angular direction of the local airstream. In one aspect, the vane assembly 53 may rotate to remain continuously aligned with the local airstream as illustrated by the dashed line and arrow shown in FIG. 2. In one aspect, the vane assembly 53 may be connected to an angular position sensor 10, which converts the rotational position and/or motion of the vane assembly 53 to an electrical signal as described below and illustrated in FIG. 4.

In one aspect, the aircraft airflow sensor probe 100 may include a main housing assembly 1. In one aspect, the main housing assembly 1 may include a rear cover 34 that may be arranged internally within the aircraft. In one aspect, the main housing assembly 1 may include a water intrusion guard 25 that may be arranged externally to the aircraft. In one aspect, the main housing assembly 1 may include a front cover 7 that may be arranged externally to the aircraft.

The main housing assembly 1 that may include the rear cover 34, the water intrusion guard 25, and the front cover 7 may be implemented as a protective case for the aircraft airflow sensor probe 100. In one aspect, the main housing assembly 1 may be hermetically sealed to prevent intrusion of foreign objects. In one aspect, the main housing assembly 1 may be waterproof, watertight, and/or water resistant to prevent intrusion of water and other liquids present in the environment of the main housing assembly 1 and the aircraft. In this regard, the main housing assembly 1 may include one or more seals, gaskets, adhesive, waterproof coating, potting materials, and the like. These aspects may be implemented for applications in extreme outdoor environments for protection of the aircraft airflow sensor probe 100.

In one aspect, the aircraft airflow sensor probe 100 may include a flange 104 on the main housing assembly 1 for attachment to the aircraft. In one aspect, the flange 104 may include flange apertures 106 configured to receive a mechanical fastener for fastening the flange 104 and the aircraft airflow sensor probe 100 to the aircraft.

In one aspect, the aircraft airflow sensor probe 100 may include signal connections 108 on the main housing assembly 1 and/or the rear cover 34. In one aspect, the signal connections 108 may be connected to the aircraft to provide sensor readings and the like to the aircraft. In one aspect, the signal connections 108 may be electrical connections. In one aspect, the signal connections 108 may be optical connections. In one aspect, the signal connections 108 may be electrical and/or optical connections. In one aspect, the signal connections 108 may also receive power for operating the aircraft airflow sensor probe 100 from the aircraft.

Figure 3:
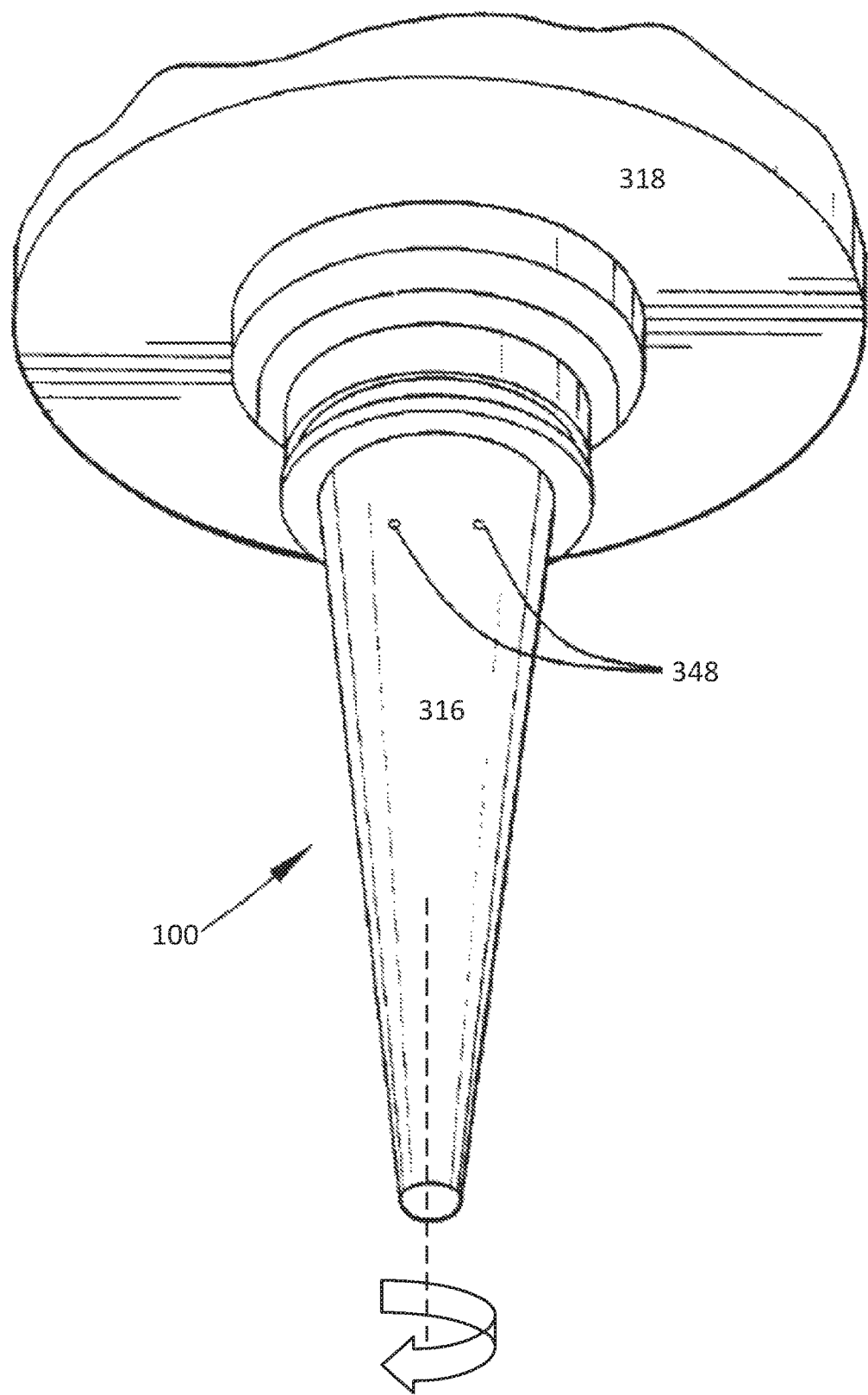
FIG. 3 illustrates a side perspective view of another aspect of an aircraft airflow sensor probe according to the disclosure.

FIG. 3 illustrates a side perspective view of another aspect of an aircraft airflow sensor probe according to the disclosure.

In other aspects illustrated in FIG. 3, the aircraft airflow sensor probe 100 may be a cone-type sensor. In this aspect, the aircraft airflow sensor probe 100 may be a cone-type, forward-fuselage mounted, sensor. In other aspects, the aircraft airflow sensor probe 100 may be a cone-type, forward-fuselage mounted, electrically anti-iced, sensor. When mounted in the aircraft, a cone assembly 316 extends perpendicular to the aircraft skin 318 in order to sense the angular direction of the local airstream. The cone assembly 316, which rotates to remain continuously aligned with the local airstream (as illustrated by the dashed line and arrow), may be connected to the angular position sensor 10 as described below and illustrated in FIG. 4, which converts the rotational position and/or motion of the cone assembly 316 to an electrical signal. The angular position sensor 10 may be used to accurately measure the angular displacement of the cone assembly 316 with respect to the airflow. In particular, in some aspects, the angular displacement of ports 348 on the cone assembly 316 may have a sinusoidal variation in differential pressure for angles up to plus and minus 90. The angular position sensor 10 may provide a normalized angle of attack, an actual local flow angle, and/or the like. A detailed description of the cone assembly 316 is provided in U.S. Pat. No. 6,012,331 issued Jan. 11, 2000 and incorporated by reference herein in its entirety. For brevity of disclosure, the remaining description will focus on the implementation of the vane type implementation. However, the above-noted cone type implementation may be utilized consistent with the disclosure.

Figure 4:
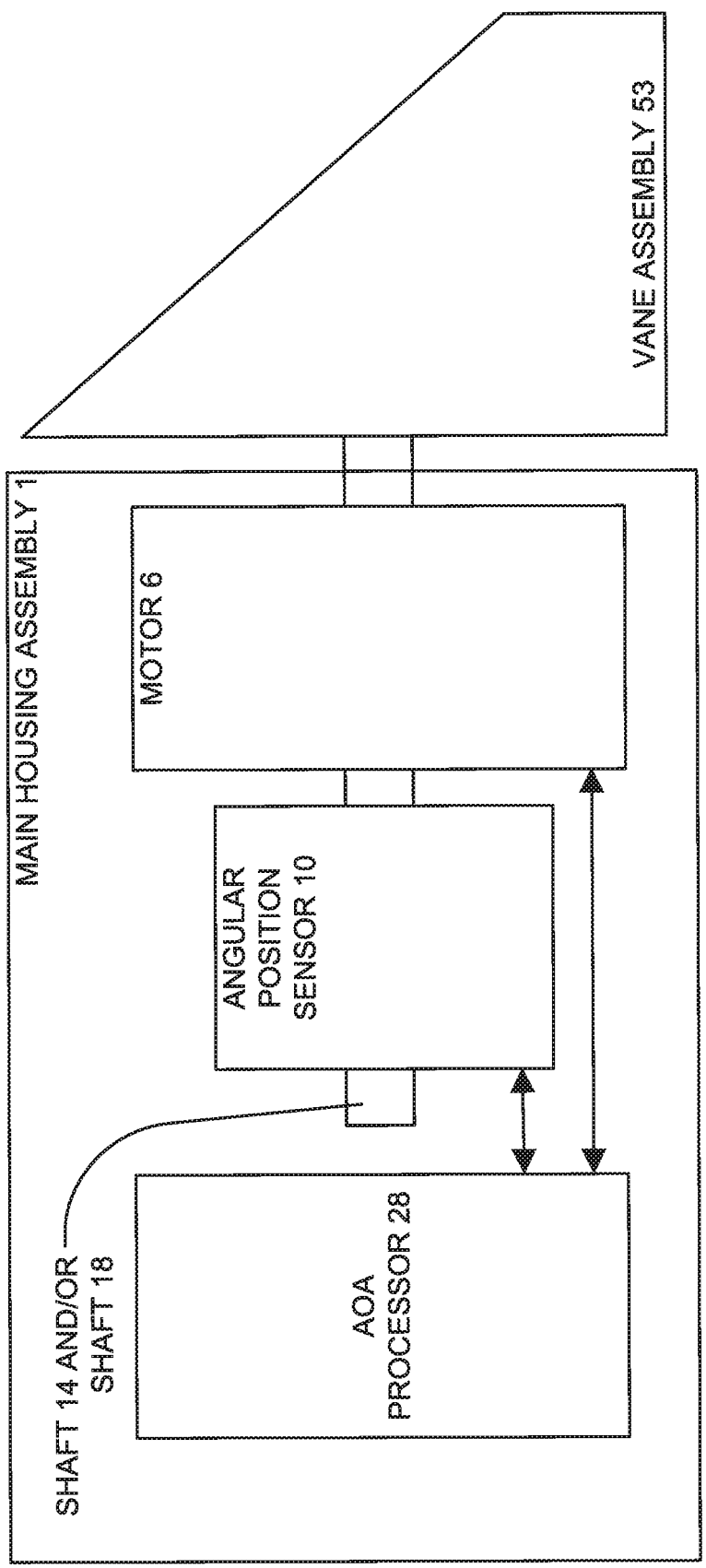
FIG. 4 illustrates a schematic of the aircraft airflow sensor probe according to the disclosure.

FIG. 4 illustrates a schematic of the aircraft airflow sensor probe according to the disclosure.

In one aspect, the vane assembly 53 may be connected to an angular position sensor 10, which converts the rotational position and/or motion of the vane assembly 53 to an electrical signal. The angular position sensor 10 may be used to accurately measure the angular displacement of the vane assembly 53 with respect to the airflow. The angular position sensor 10 may provide a normalized angle of attack, an actual local flow angle, and/or the like. In this regard, the displacement of the vane assembly 53 may be with respect to an aircraft mechanical reference. The normalized AOA is a fraction of the wing (aircraft) lift with respect to angle of attack; equal to 1 at the stall angle and zero at the zero lift angle. The vane assembly 53 or cone assembly may always be aligned with the airflow.

In one aspect, the angular position sensor 10 may be a Rotary Variable Differential Transformer (RVDT), which converts the rotational motion to an electrical signal. The RVDT may be implemented as an electromechanical transducer that may provide a variable output voltage that is linearly proportional to the angular displacement of an input shaft. A single RVDT may be provided for measuring the vane angle (free airstream) with respect to the centerline of the aircraft. This measurement may be used by the aircraft airflow sensor probe 100 to calculate AOA. Additionally, this measurement may be used by the aircraft airflow sensor probe 100 to calculate a rate of change of the AOA. In other aspects, the angular position sensor 10 may be a rotary encoder, an angular transducer, a linear transducer configured to measure rotary motion, and/or the like. In further aspects, a plurality of angular position sensors 10 may be utilized on the same shaft in order to provide redundancy, increase accuracy, and/or the like.

With further reference to FIG. 4, the aircraft airflow sensor probe 100 may include a main housing assembly 1 that supports the vane assembly 53. More specifically, the vane assembly 53 may be supported by one or more shafts in order to rotate and sense the airflow past the vane assembly 53. In one aspect, the shafts may include a shaft 14 and/or a rear shaft 18.

In one aspect, the aircraft airflow sensor probe 100 may include an angle of attack (AOA) processor 28 or other processor that may utilize the angular position sensor 10 output signal and may calculate the desired output parameters. In one aspect, the AOA processor 28 may include sensor circuitry that may include an analog to digital converter, a filter, other signal conditioning circuitry, and the like to determine AOA and/or rate of change of the AOA. In one aspect, the angular position sensor 10 may include sensor circuitry that may include an analog to digital converter, a filter, other signal conditioning circuitry, and the like and transmit a signal indicative of the AOA and/or rate of change of the AOA to the AOA processor 28. In some aspects, the AOA processor 28 may be configured on a printed circuit board, on a printed wire assembly, or the like within the aircraft airflow sensor probe 100.

The aircraft airflow sensor probe 100 may further include a motor 6 that may be connected to the shaft 14 and/or the shaft 18 supporting rotation of the vane assembly 53. In some aspects, the motor 6 may provide at least two functions: position the vane assembly 53 at known angles during Pilot Activated Test (Initiated Build-In-Test (IBIT) that may include reading and verifying the angle with the angular position sensor 10); and reduce, increase, or apply a torque (damp) on the vane assembly 53 due to airstream flutter or the like. Moreover, in certain aspects the motor 6 may help reduce dependence on aerodynamic (flow induced) torque, which can be very small. With the delta pressure information, the motor 6 can produce a much more accurate result because the motor 6 may overcome hysteresis and mechanical losses that aerodynamic forces may not, especially at low airspeeds The motor 6 may provide a damping factor to compensate for small perturbations in the dynamic angular response of the vane assembly 53. In one aspect, the motor 6 may be used to dither the vane assembly 53 position by applying a time varying torque with a constant peak value. In this regard, this may be an effective way to remove hysteresis from the angle measurement. The motor 6 may be implemented as any type electrical motor. In one aspect, the motor 6 may be implemented as a brushless permanent magnet motor. In another aspect, the motor 6 may be implemented as a frameless motor where the chassis of the aircraft airflow sensor probe 100 functions as the frame or housing of the motor. In one aspect, the motor 6 may be implemented as permanent magnet eddy current damper. In this aspect, eddy currents may be generated in a conductor in a magnetic field. In one aspect, a permanent magnet. In one aspect, a heavy permanent magnet. In one aspect, a non-adjustable magnet to reduce interference with various aircraft components such as the compass. In one aspect, the motor 6 may be implemented to utilize cogging torque. In one aspect, this may be a torque due to the interaction between permanent magnets of a rotor and stator slots of the motor 6. In a particular aspect, the motor 6 may be configured to receive commands to provide a torque to an associated motor shaft, the shaft 14, and/or the shaft 18 that may form part of the aircraft airflow sensor probe 100.

Figure 5:
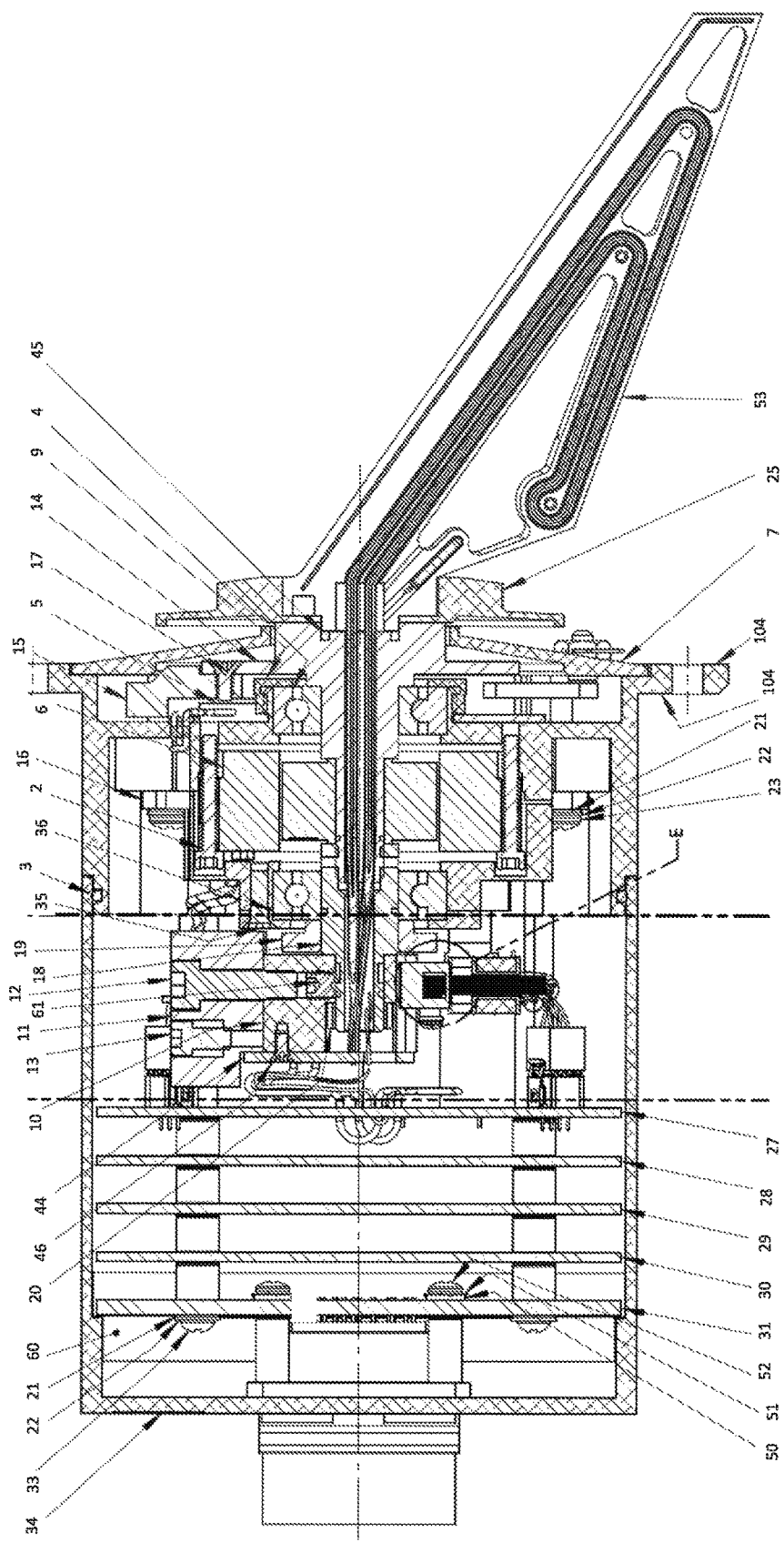
FIG. 5 illustrates a cross-sectional view of the aircraft airflow sensor probe according to FIG. 1.
Figure 6:
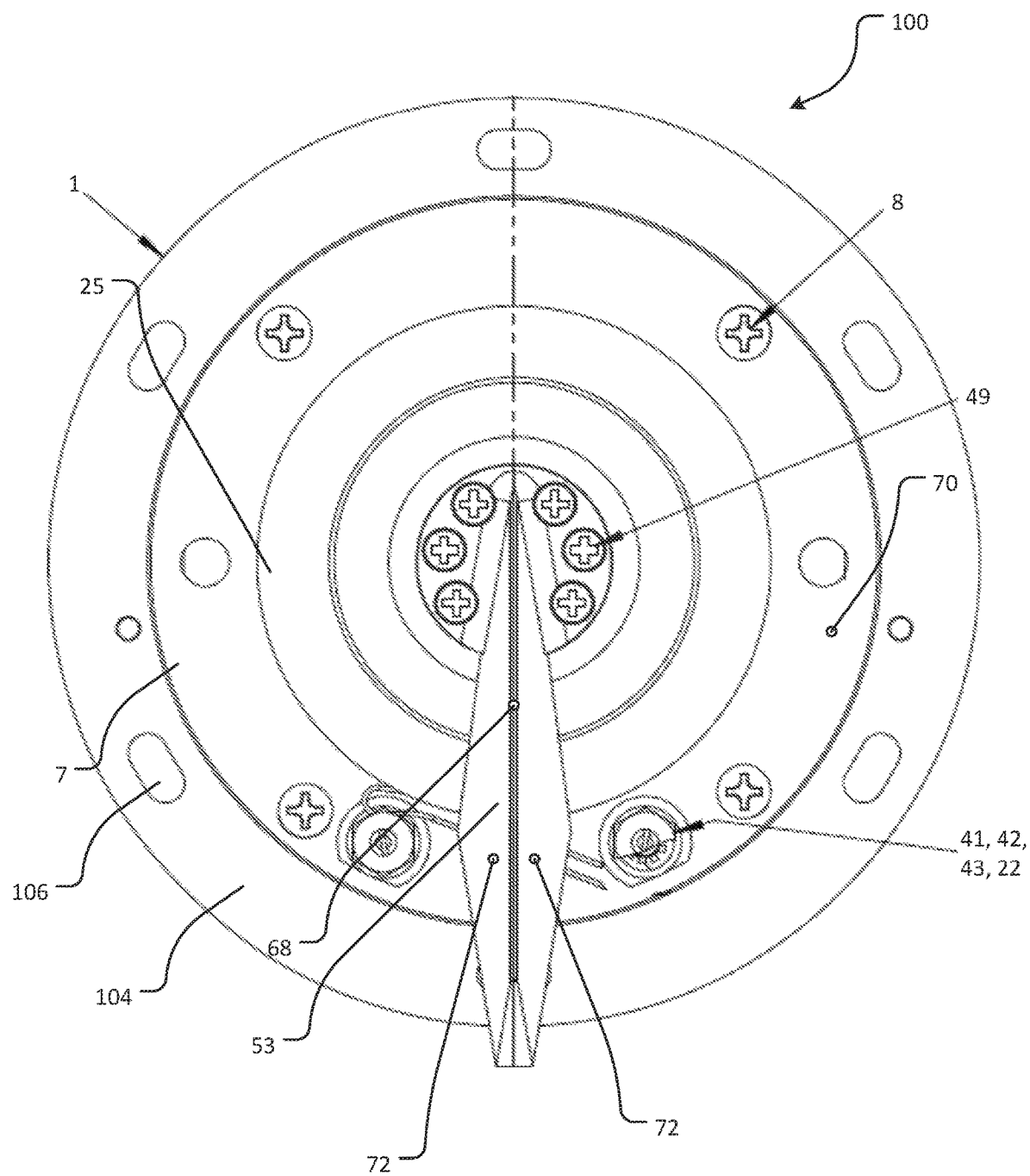
FIG. 6 illustrates a front view of the aircraft airflow sensor probe according to FIG. 1.
Figure 7:
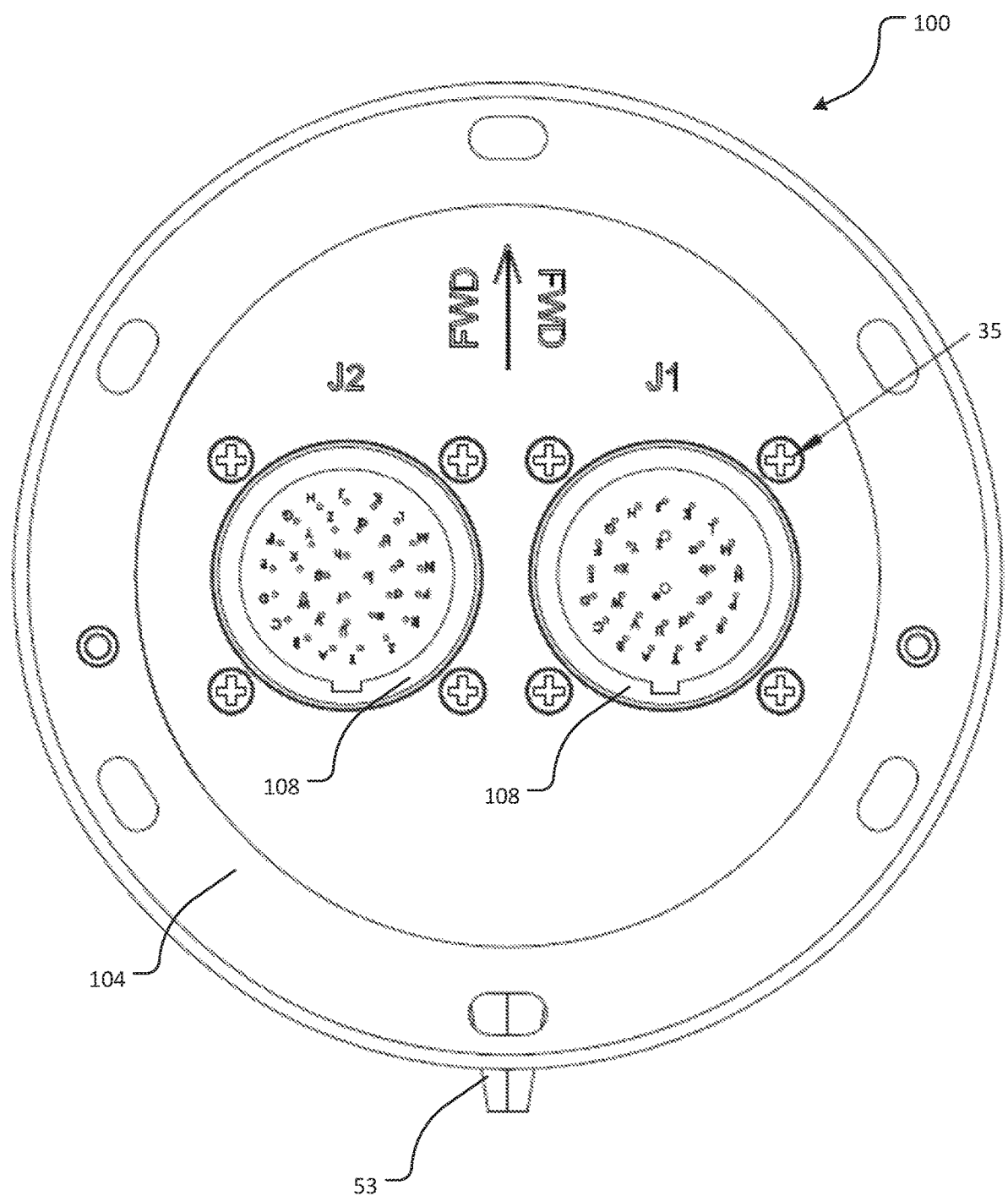
FIG. 7 illustrates a backside view of the aircraft airflow sensor probe according to FIG. 1.
Figure 8:
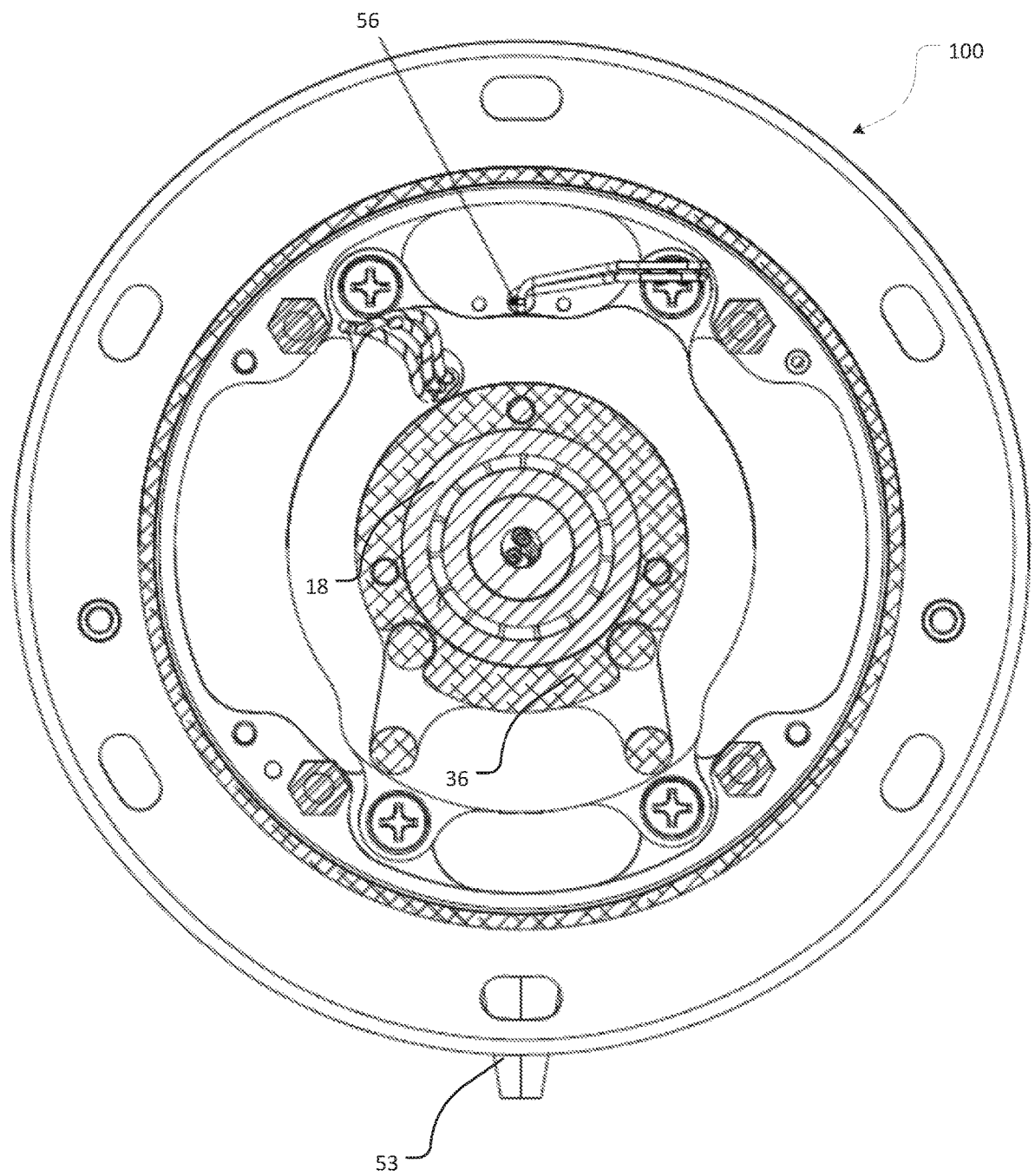
FIG. 8 illustrates another cross-sectional view of the aircraft airflow sensor probe according to FIG. 1.
Figure 9:
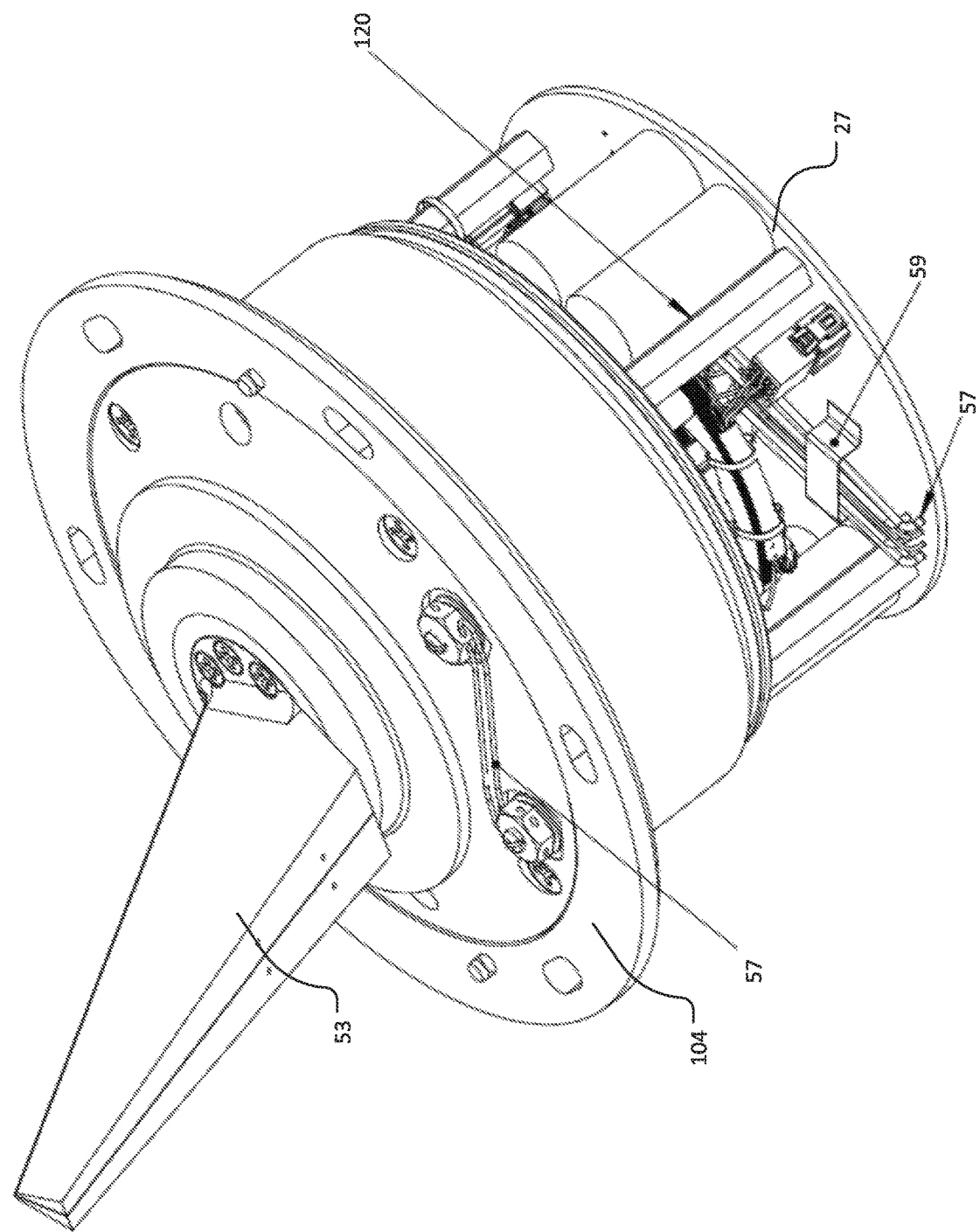
FIG. 9 illustrates a partial front side perspective view of the aircraft airflow sensor probe according to FIG. 1.
Figure 10:
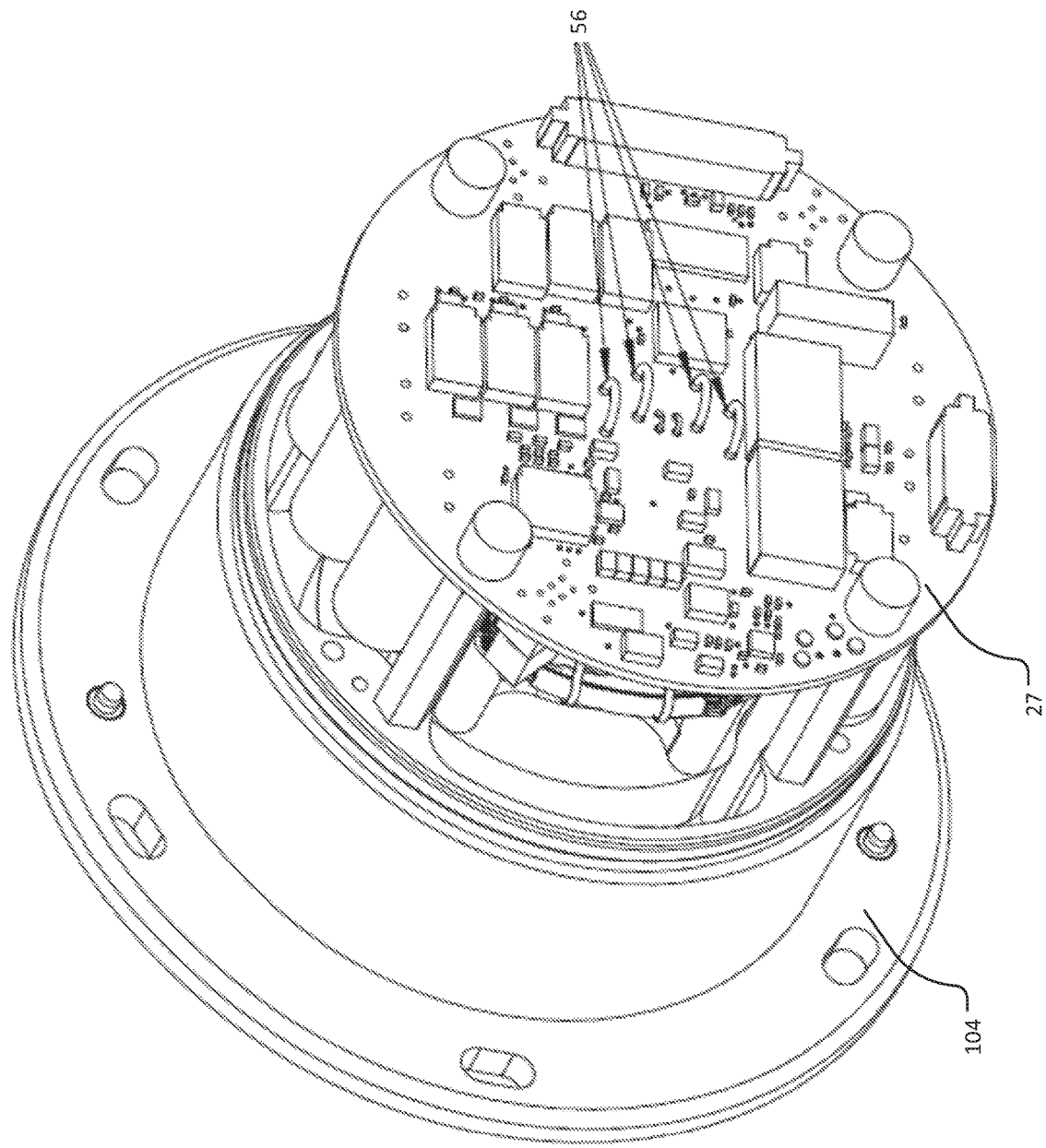
FIG. 10 illustrates a partial backside perspective view of the aircraft airflow sensor probe according to FIG. 1.
Figure 11:
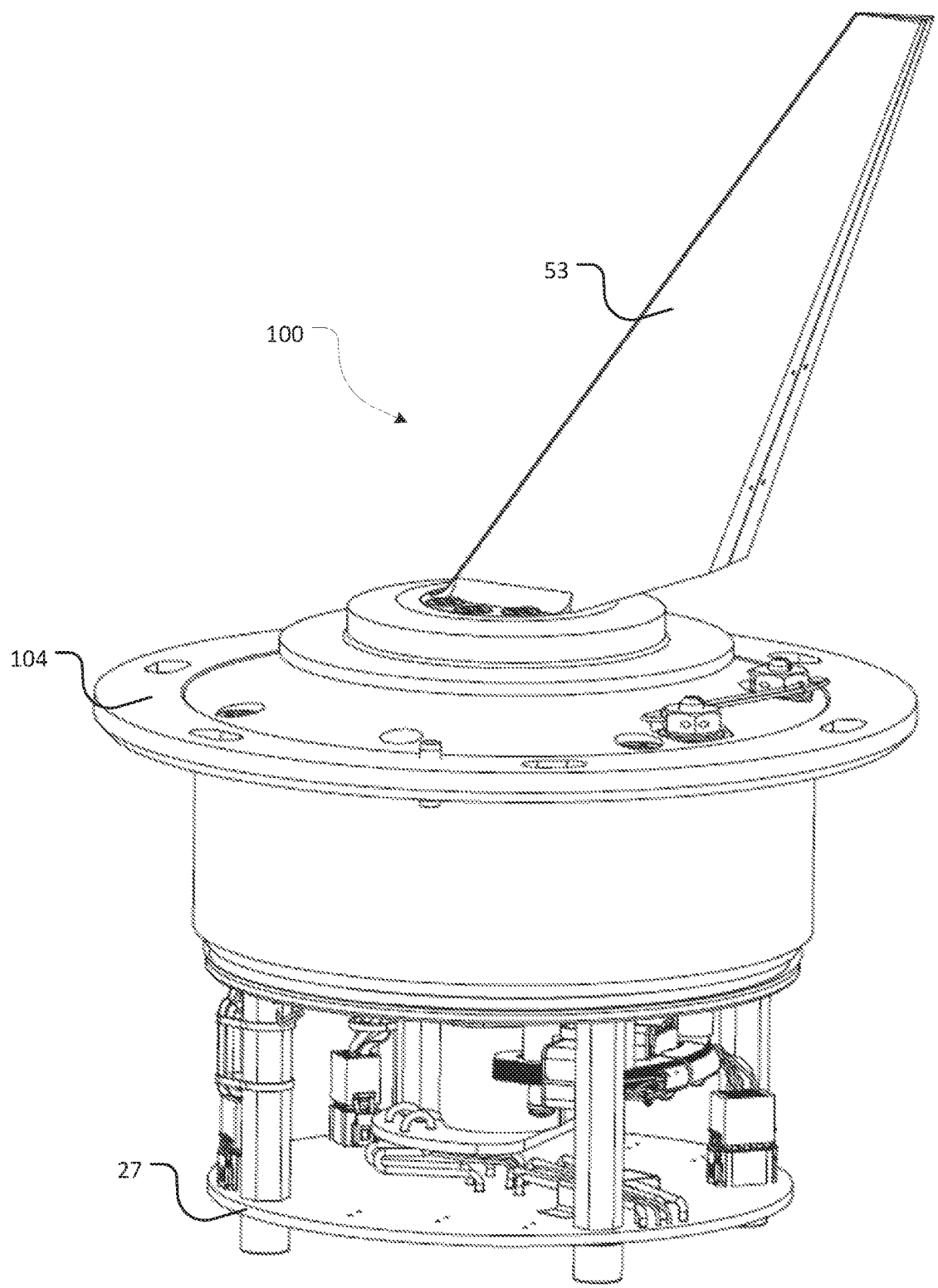
FIG. 11 illustrates a partial perspective side view of the aircraft airflow sensor probe according to FIG. 1.
Figure 12:
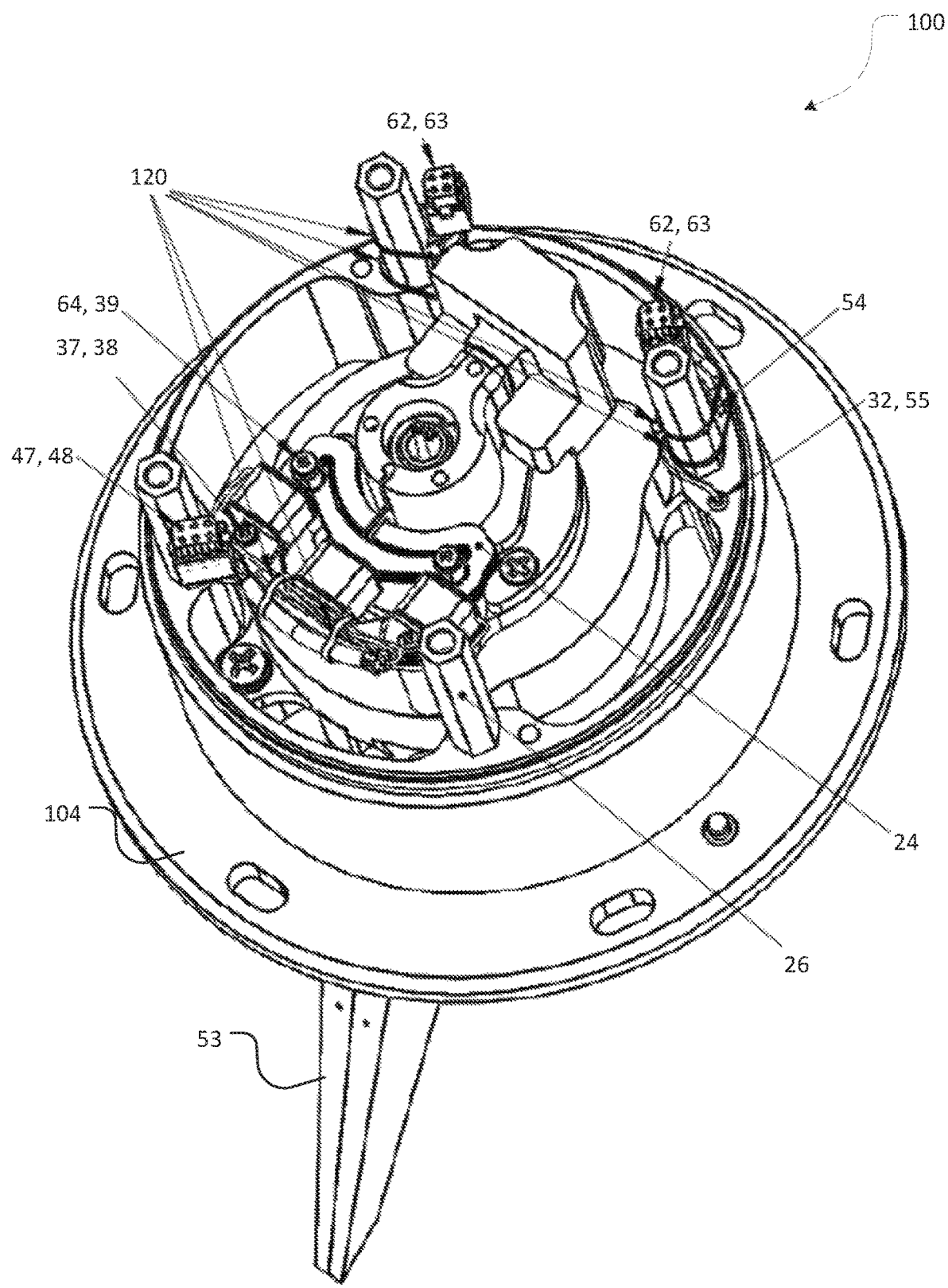
FIG. 12 illustrates another partial backside perspective view of the aircraft airflow sensor probe according to FIG. 1.

FIG. 5 illustrates a cross-sectional view of the aircraft airflow sensor probe according to FIG. 1; FIG. 6 illustrates a front view of the aircraft airflow sensor probe according to FIG. 1; FIG. 7 illustrates a backside view of the aircraft airflow sensor probe according to FIG. 1; FIG. 8 illustrates another cross-sectional view of the aircraft airflow sensor probe according to FIG. 1; FIG. 9 illustrates a partial front side perspective view of the aircraft airflow sensor probe according to FIG. 1; FIG. 10 illustrates a partial backside perspective view of the aircraft airflow sensor probe according to FIG. 1; FIG. 11 illustrates a partial perspective side view of the aircraft airflow sensor probe according to FIG. 1; and FIG. 12 illustrates another partial backside perspective view of the aircraft airflow sensor probe according to FIG. 1.

With reference to FIG. 5, the aircraft airflow sensor probe 100 may include the main housing assembly 1 that supports the vane assembly 53. More specifically, the vane assembly 53 may be supported by one or more shafts in order to rotate and sense the airflow past the vane assembly 53. In one aspect, the shaft may include a shaft 14 and a rear shaft 18. The shaft 14 and/or the rear shaft 18 may be supported within the main housing assembly 1 with bearings. In one aspect, the bearings may include a bearing 4 and a bearing 36.

The shaft 14 and/or shaft 18 may be connected to the motor 6. In one aspect, the shaft 14 and/or shaft 18 may extend through the motor 6 and may be part of the motor 6. In this regard, the motor 6 may be configured to control rotation of the shaft 14 and/or shaft 18. In one aspect, the motor 6 applies a torque to the shaft 14 and/or the shaft 18 to damp rotational movement of the shaft 14 and/or shaft 18 as well as the vane assembly 53. In another aspect, the motor 6 applies a torque to the shaft 14 and/or the shaft 18 to rotate the shaft 14 and/or the shaft 18 as well as the vane assembly 53. In other aspects, the motor 6 may be connected to the shaft 14 and/or shaft 18 through an intermediate transmission or similar structure.

The motor 6 may include a motor controller 27. In one aspect, the motor controller 27 may be configured to operate the motor 6 to provide the torque to the one or more shafts. The torque generated on the shaft 14 and/or shaft 18 by the motor 6 may provide a damping force to the shaft 14 and/or shaft 18 and moreover a damping force to the vane assembly 53. In other aspects, the motor controller 27 may be configured to operate the motor 6 to rotate the shaft 14 and/or shaft 18 and rotate the vane assembly 53 for initialization and the like. In some aspects, the motor controller 27 may be configured on a printed circuit board, on a printed wire assembly, or the like within the aircraft airflow sensor probe 100.

Figure 14:
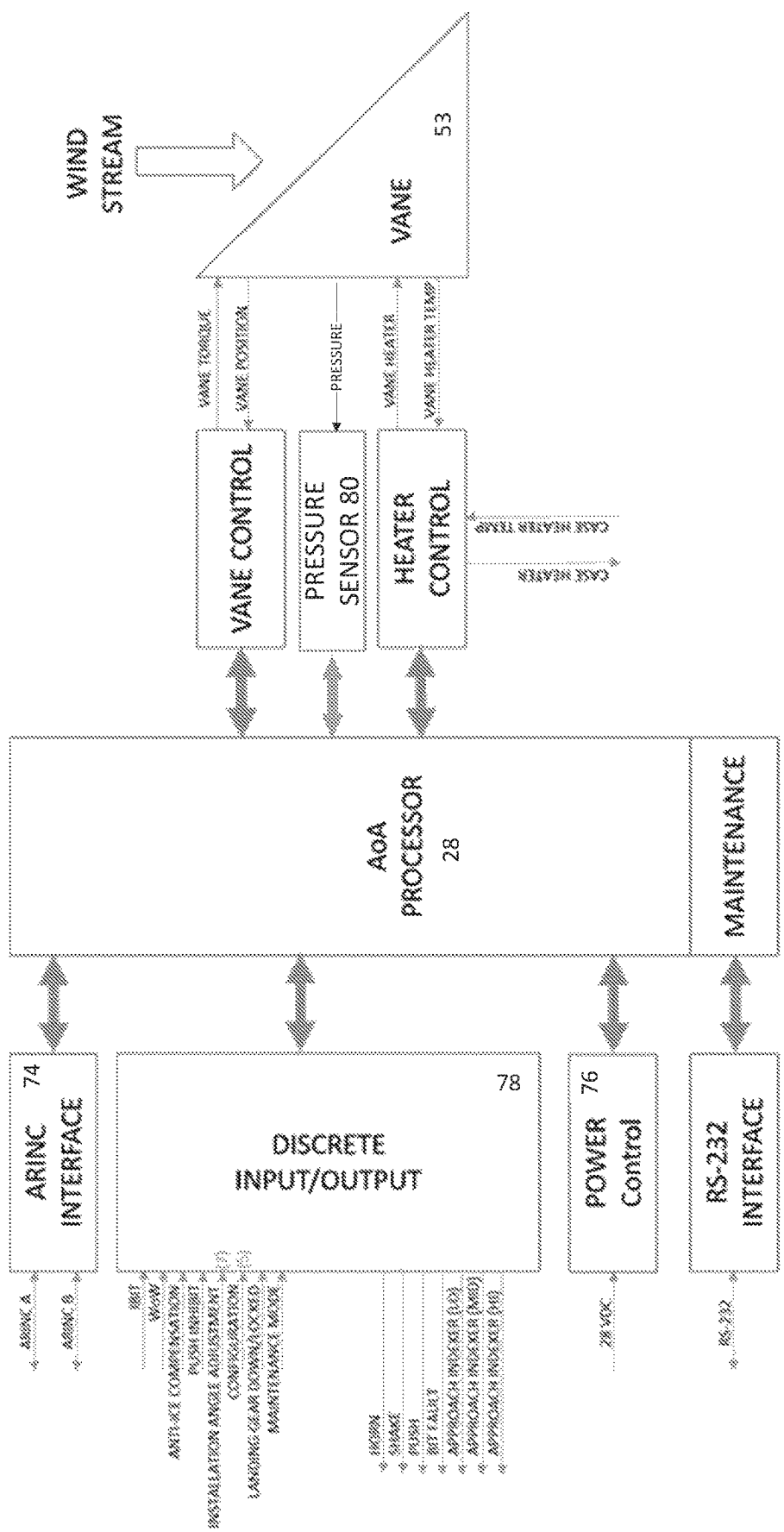
FIG. 14 illustrates a schematic of the aircraft airflow sensor probe according to FIG. 1.

FIG. 14 illustrates a schematic of the aircraft airflow sensor probe according to FIG. 1.

The aircraft airflow sensor probe 100 may further include a number of air pressure sensors 80. The air pressure sensors 80 may include one or more air pressure ports configured to receive air pressure exerted on the aircraft airflow sensor probe 100 and/or the vane assembly 53. The air pressure ports may be located on the aircraft airflow sensor probe 100 and/or the vane assembly 53 and receive air and direct the air to an air pressure sensor 80 that senses the air pressure received by the air pressure ports. The air pressure sensor 80 may use a force collector (such a diaphragm, piston, bourdon tube, bellows, or the like) to measure strain (or deflection) due to an applied force over an area (pressure). The air pressure sensor 80 may be implemented as a strain gauge, piezoresistive strain gauge, a capacitive sensor, an electromagnetic sensor, a piezoelectric sensor, an optical sensor, a potentiometric sensor, and the like. The air pressure sensor 80 and/or sensor circuitry may include an analog to digital converter, a filter, other signal conditioning circuitry, and the like and transmit a signal indicative of the air pressure received at a particular air pressure port to the AOA processor 28.

In one aspect in reference to FIG. 6, an air pressure port 68 may be located on a leading edge of the vane assembly 53 in order to receive an air pressure indicative of an airflow velocity impacting the vane assembly 53. The air pressure sensor 80 may be configured to measure the dynamic pressure in order to obtain an airspeed, Mach number, and the like. In one aspect, the AOA processor 28 may be configured to calculate airspeed, Mach number, and the like in response to signals from the air pressure sensor 80. In one aspect, the AOA processor 28 may be configured to receive and/or calculate airspeed, Mach number, and the like in response to signals from the aircraft.

In one aspect, air pressure ports 72 may be located on both a top surface and bottom surface of the vane assembly 53 in order to receive an air pressure for these respective surfaces.

In this aspect, there may be air pressure sensors 80 associated with each air pressure port 72 in order to determine a pressure differential between the top surface and bottom surface of the vane assembly 53. In one aspect, the AOA processor 28 may be configured to calculate the pressure differential in response to signals from the air pressure sensors 80. A pressure differential exceeding a predetermined threshold may be indicative of flutter or other movement in the vane assembly 53. In one aspect, the differential pressure may be used to compute a vane misalignment.

In one aspect, an air pressure port 70 may be located on the aircraft airflow sensor probe 100 in order to receive a static air pressure. The static air pressure may be utilized to determine an altitude, altitude trend, and the like. In one aspect, the AOA processor 28 may be configured to calculate an altitude, altitude trend, and the like in response to signals from the air pressure sensor 80. In one aspect, the AOA processor 28 may be configured to receive and/or calculate an altitude, altitude trend, and the like in response to signals from the aircraft.

In one aspect, there may be a plurality of air pressure ports and a plurality of air pressure sensors 80 in order to measure the airflow velocity, the static air pressure, and the pressure differential as described above.

Figure 13:
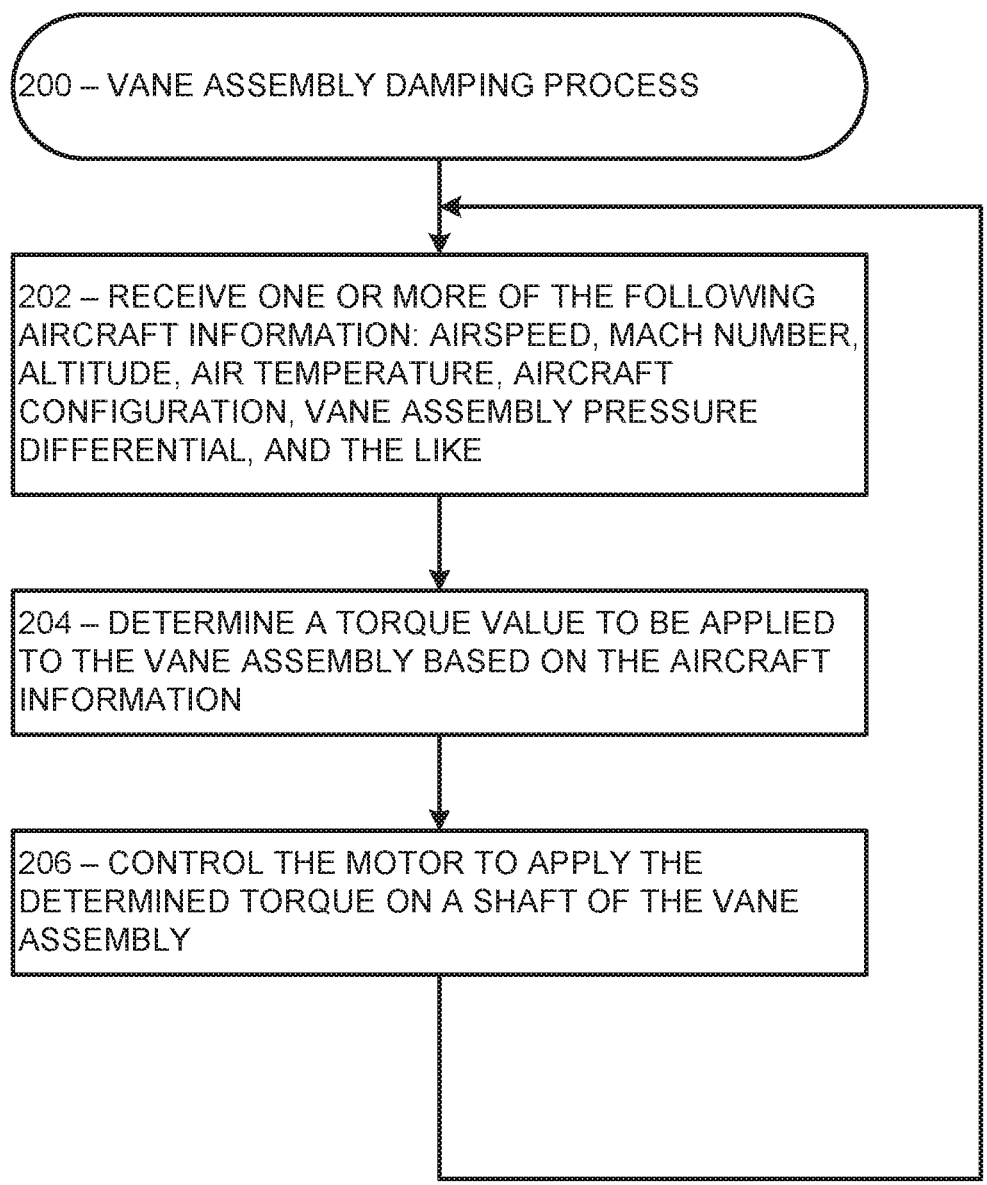
FIG. 13 illustrates an operational process implemented by the aircraft airflow sensor probe according to FIG. 1.

FIG. 13 illustrates an operational process implemented by the aircraft airflow sensor probe according to FIG. 1.

In particular, FIG. 13 illustrates a vane assembly damping process 200. In box 202, the aircraft airflow sensor probe 100 may receive and/or calculate one or more of the following aircraft information: airspeed, Mach number, altitude, air temperature, aircraft configuration, vane assembly pressure differential, AOA, rate of change of the AOA, and the like.

In this regard, the airspeed, Mach number, altitude, and vane assembly pressure differential aircraft information may be obtained from the air pressure sensors 80 associated with the air pressure ports 68, 70, and 72 as described above. Additionally, the outputs of the air pressure sensors 80 may be processed in the AOA processor 28 to generate the airspeed, Mach number, altitude, and vane assembly pressure differential aircraft information. Alternatively, the airspeed, Mach number, and other information may be received by the aircraft airflow sensor probe 100 through electrical interfaces from the aircraft as described below.

The air temperature may be obtained from an air temperature sensor located on the aircraft airflow sensor probe 100 or the temperature sensor located on the aircraft and received by the aircraft airflow sensor probe 100 through electrical interfaces as described below. The air temperature sensor may be implemented as a thermistor, thermocouple, resistance thermometer, silicon bandgap temperature sensor, or the like.

The AOA may be obtained from the angular position sensor 10 of the aircraft airflow sensor probe 100 and calculated with the AOA processor 28. The rate of change of the AOA may also be obtained from the angular position sensor 10 of the aircraft airflow sensor probe 100 and calculated with the AOA processor 28.

The aircraft configuration may be received by the aircraft airflow sensor probe 100 through the electrical interfaces described below. The aircraft configuration information may include a state of the flaps, speed brakes, weight on wheels, landing gear down/locked, and the like.

In box 204, the AOA processor 28 may determine a torque value to be applied to the vane assembly 53 based on the aircraft information. In particular, the torque value to be applied by the motor 6 in response to a drive signal from the motor controller 27 to damp movement of the vane assembly 53. In one aspect, the torque value may be determined by one or more algorithms based on the aircraft information received and/or calculated by the AOA processor 28. In one aspect, the algorithm models a viscous damper. In this regard, a torque may be generated such that: Torque=k*dΘ/dt. Where, Θ is the angle of the vane assembly 53, t is time, and k is programmable constant. In the algorithm, the derivative is calculated and filtered for determination and generation of the torque. In another aspect, the torque value may be determined by one or more lookup tables based on the aircraft information received and/or calculated by the AOA processor 28. Other approaches to determining the torque value based on the aircraft information received by the AOA processor 28 are contemplated as well.

In box 206, the AOA processor 28 may control the motor 6 to apply the determined torque on a shaft of the vane assembly 53. In this regard, the AOA processor 28 may signal the motor controller 27 to control the motor 6 to apply the determined torque on a shaft of the vane assembly 53.

In one aspect, the AOA processor 28 may control the motor 6 to apply the determined torque on a shaft of the vane assembly 53 when there is a pressure differential between the upper and lower sides of the vane assembly 53 that exceeds threshold values to reduce flutter of the vane assembly 53 and ensure a more accurate angle of attack determination.

In one aspect, the AOA processor 28 may control the motor 6 to apply the determined torque on a shaft of the vane assembly 53 based on the airspeed to reduce flutter of the vane assembly 53 and ensure a more accurate angle of attack determination.

In one aspect, the AOA processor 28 may control the motor 6 to apply the determined torque on a shaft of the vane assembly 53 based on the Mach number to reduce flutter of the vane assembly 53 and ensure a more accurate angle of attack determination.

In one aspect, the AOA processor 28 may control the motor 6 to apply the determined torque on a shaft of the vane assembly 53 based on the altitude or static pressure to reduce flutter of the vane assembly 53 and ensure a more accurate angle of attack determination.

In one aspect, the AOA processor 28 may control the motor 6 to apply the determined torque on a shaft of the vane assembly 53 based on the air temperature to reduce flutter of the vane assembly 53 and ensure a more accurate angle of attack determination.

In one aspect, the AOA processor 28 may control the motor 6 to apply the determined torque on a shaft of the vane assembly 53 based on a rate of change of the AOA that exceeds a predetermined threshold to reduce flutter of the vane assembly 53 and ensure a more accurate angle of attack determination. In one aspect, the AOA processor 28 may control the motor 6 utilizing continuous control.

In one aspect, the AOA processor 28 may control the motor 6 to apply the determined torque on a shaft of the vane assembly 53 based on the AOA to reduce flutter of the vane assembly 53 and ensure a more accurate angle of attack determination.

In one aspect, the AOA processor 28 may control the motor 6 to apply the determined torque on a shaft of the vane assembly 53 based on the aircraft configuration to reduce flutter of the vane assembly 53 and ensure a more accurate angle of attack determination.

In one aspect, the AOA processor 28 may control the motor 6 to apply the determined torque on a shaft of the vane assembly 53 based on a combination of the above noted aircraft information to reduce flutter of the vane assembly 53 and ensure a more accurate angle of attack determination.

Accordingly, the aircraft airflow sensor probe 100 may be configured to control the vane assembly 53 through operation of the motor 6 to damp rotational movement of the vane assembly 53 to reduce flutter and other perturbations of the vane assembly 53 in order to obtain a more accurate position of the vane assembly 53.

In one aspect, since the vane assembly 53 is in the direct air stream it will be subjected to freezing temperatures and potential ice buildup. For this reason, the vane assembly 53 may be heated with a heater with sufficient power to ensure that ice does not affect the free movement of the vane assembly 53. A case (chassis) heater and a thermistor may be installed to control the case external temperature to avoid condensation. In one aspect, the angular position sensor 10 may sense a lack of movement of the vane assembly 53 indicative of ice buildup and the AOA processor 28 may initiate operation of the heater. Moreover, this lack of movement may also indicate a stuck probe or other mechanical failure. In particular, the vane assembly 53 motion may be monitored by the angular position sensor 10 and the AOA processor 28 to detect a stuck probe. In one aspect, if the signal standard deviation gets too small, the vane assembly 53 is considered stuck.

The aircraft airflow sensor probe 100 can be mechanically mounted on either the port side, the starboard side, or both sides of the forward fuselage and may electrically connect to several aircraft discretes, power, and dual redundant Aeronautical Radio, Incorporated (ARINC) communication busses, and the like through the signal connections 108. However, it should be noted that any type of data bus may be utilized including ARINC, 1553, Controller Area Network (CAN), and the like. The aircraft airflow sensor probe 100 may also provide a maintenance interface, not connected to the aircraft, allowing for configurations, alignment adjustments, and software uploads. The vane assembly 53 and the flange 104 may be the only parts of the aircraft airflow sensor probe 100 external to the host aircraft.

In one aspect, the airflow sensor probe implemented as a SWT may provide stall warning and protection by utilizing the vane assembly 53 as an electronically anti-iced vane, external to the host aircraft. The SWT may calculate a normalized AOA (AOAN), presented as a fraction of the angle of attack interval from zero lift to stall, for a particular configuration of the host aircraft. A distinct aircraft configuration may be determined by the combined state of the flaps, speed brake, anti-ice, and the like input parameters to the SWT. From the AOAN, host configuration, and detailed lift curves, the SWT may calculate three stall warning limits: 1) Horn, 2) Stick Shake, and 3) Stick Push.

If the Horn limit is reached, a horn discrete to the host aircraft is asserted. If the stick shake limit is reached, a stick shake discrete is asserted, and if the stick push limit is reached, a stick push discrete is asserted. Each discrete is asserted until the host aircraft orientation returns to under limit conditions.

In one aspect, the SWT may be mechanically installed and electrically connected to the aircraft. The SWT may be interchangeable in that the mechanical alignment and the discretes for configuration and alignment adjustment are made by the aircraft manufacturer during boresight alignment procedures.

The aircraft airflow sensor probe 100 may include electrical interfaces that may include: 1) dual ARINC interface 74, 2) input discretes from the host aircraft, and 3) output discretes to the host aircraft, 4) operating power, and the like.

The SWT may receive the following communication signals from the host aircraft: flap position, speed brake position, Pilot Activated Test (Initiated Built-In Test (IBIT)), and the like. The SWT may provide the following words/labels to the host aircraft: Normalized Angle of Attack, Local Angle of Attack, Built-In-Test (BIT) Fails, Normalized Angle of Attack Shaker Assertion Angle, and the like.

The AOA processor 28 may contain an operational flight program (OFP) that may control system electronics, heaters, stall warning processes, and the like. The AOA processor 28 may receive input from the ARINC communications, input discretes, angular position sensor 10 signals, and motor 6 status and control signals to determine the stall warning conditions. Based on the calculations, the AOA processor 28 may issue a horn warning, stick shake, or stick push.

In one aspect, the aircraft airflow sensor probe 100 may be configured as a single Line-Replaceable Unit (LRU) that is connected to the aircraft power lines. The LRU configuration may be a modular component of the airplane that is designed to be replaced quickly at an operating location. In this regard, the aircraft airflow sensor probe 100 may be mechanically installed and electrically connected to the aircraft. The aircraft airflow sensor probe 100 may be interchangeable in that the mechanical alignment and the discrete configuration and alignment adjustment are made by the aircraft manufacturer during boresight alignment procedures.

The aircraft airflow sensor probe 100 may have an input discrete for maintenance mode. The maintenance mode may be used for system verification, to troubleshoot BIT (Built In Test) failures, update the operational flight program (OFP) software, and provide a means to upload lift curves.

Referring back to FIG. 14, the aircraft airflow sensor probe 100 may include hardware that may be responsible for all environmental protection, any power conditioning, and conversion, raw signal sensing, and relay of signal data. The aircraft airflow sensor probe 100 may include software implemented by a processor such as the AOA processor 28 that may be responsible for data monitoring, data conversion, calculations, operational modes, coordinating/configuring hardware to sense, send, or receive data, and the like.

The aircraft airflow sensor probe 100 hardware design may include the AOA processor 28 implemented as a Digital Signal Controller microcontroller (MCU). The MCU may perform all necessary data calculations for the aircraft airflow sensor probe 100. Communication to external aircraft systems may be accomplished via ARINC 429 communication buses and discrete signals. However, it should be noted that any type of data bus may be utilized including ARINC, 1553, CAN, and the like.

The AOA processor 28 may contain the operational flight program (OFP) and control the system electronics, heaters, and stall warning processes. The AOA processor receives input from the ARINC 429 communications, discrete inputs, RVDT, and control the motor 6 damping, determine the stall warning conditions, and the like. Based on the AOA calculations the AOA processor may issue a horn warning, stick shake, or stick push.

The aircraft airflow sensor probe 100 may include an ARINC 429 transceiver or interface 74. The ARINC 429 transceiver or interface 74 may provide ARINC 429 electrical drivers and receivers. It is the interface with ARINC 429 specification compatible devices and transmits labels as requested by the SWT application software.

The aircraft airflow sensor probe 100 may include a power supply module 76. The power supply module 76 provides conditioned power to the stall warning computer and angular position transmitter electronics. In some aspects, the power supply module 76 may be configured on a printed circuit board, on a printed wire assembly, or the like within the aircraft airflow sensor probe 100.

The aircraft airflow sensor probe 100 may include an I/O module 78. The I/O module 78 may relay signals and may connect to power buses between external aircraft systems and the SWT hardware. It also provides the circuitry to meet lightning, Electromagnetic Interference (EMI), and HIRF requirements.

The vane and system mount may be the only components external to the host aircraft. The vane includes a powered heating element for continuous anti-icing during flight.

The aircraft airflow sensor probe 100 may include numerous other components. In particular, with reference to the Figures and in particular FIG. 5 the aircraft airflow sensor probe 100 may include one or more of a fastener 2, a cover seal 3, a heater blanket 5, a fastener 8, a bearing cap 9, a hub counterweight 11, a fastener 12, a fastener 13, a counterweight 15, a motor-bearing support 16, a fastener 17, fastener 19, a rotor clamp fastener 20, a washer 21, a washer 22, a fastener 23, an element assembly 24, a standoff 26, a power supply 29, an interface 30, a connector 31, a thermistor 32, a fastener 33, a fastener 35, a washer 37, a fastener 38, a fastener 39, an identification plate 40, a fastener 41, a washer 42, a mechanical stop assembly 43, a hub board printed wiring board 44, an O-ring 45, a fastener 46, a female crimp housing 47, a female cable crimp contact 48, a fastener 49, a washer 50, a washer 51, a fastener 52, lacing tape 54, a thermally conductive epoxy 55, an adhesive compound 56, a safety wire or lock 57, a shielding tape 59, end portion 60, a set screw 61, a female crimp housing 62, and standoffs 120, a female cable crimp contact 63, a washer 64, and the like.

In accordance with various aspects of the disclosure, a ratio between a change in local airstream direction and the corresponding change in a resultant output may represent a "normalized angle of attack" that is varied as a function of flap position and the resultant output is biased as a function of flap position so that the resultant output represents a zero "normalized angle of attack" whenever the combination of flap position and local airstream direction is such that the aerodynamic lift is zero and so that the resultant output represents 100 percent of a "normalized angle of attack" whenever the combination of flap position and local airstream direction is such that a further increase in angle of attack would result in stalling of aircraft. The resultant output representing a "normalized angle of attack" may be utilized for indication or control purposes.

Accordingly the disclosure set forth an aircraft airflow sensor probe that is more accurate, less susceptible to airflow conditions that generate flutter, can adjust damping functionality, and the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible non-transitory storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. An aircraft airflow sensor probe comprising:
    an airflow assembly configured to sense a direction of local airflow outside an aircraft;
    a shaft configured to rotatably hold the airflow assembly and allow rotational movement of the airflow assembly;
    a motor connected to the shaft and configured to generate a torque to damp the rotational movement of the shaft as well as the airflow assembly;
    an angle of attack processor configured to control the motor to generate the torque to damp the rotational movement of the shaft as well as the airflow assembly based on at least one of the following: a static air pressure, an airflow velocity, a pressure differential between an upper side of the airflow assembly and a lower side of the airflow assembly, a rate of change of a position of the airflow assembly, a position of the airflow assembly, or an ambient temperature; and
    a sensor configured to sense a position of the airflow assembly and provide the position of the airflow assembly to the angle of attack processor,
    wherein the airflow assembly comprises one of the following: a vane assembly configured to sense a direction of local airflow outside an aircraft and a cone assembly configured to sense a direction of local airflow outside an aircraft.

2. The aircraft airflow sensor probe according to claim 1 further comprising:
    at least one air pressure sensor configured to determine an air pressure received by an air pressure sensor port;
    wherein the air pressure comprises at least one of the following: a static air pressure, an airflow velocity, and a pressure differential between an upper side of the airflow assembly and a lower side of the airflow assembly; and
    wherein the angle of attack processor is further configured to control the motor to generate the torque to damp the rotational movement of the shaft as well as the airflow assembly in response to the air pressure determined by the at least one air pressure sensor.

3. The aircraft airflow sensor probe according to claim 1:
    wherein the sensor is further configured to sense a rate of change of the position of the airflow assembly and provide the rate of change of the position of the airflow assembly to the angle of attack processor; and
    wherein the angle of attack processor is further configured to control the motor to generate the torque to damp the rotational movement of the shaft as well as the airflow assembly in response to the rate of change of the position of the airflow assembly.

4. The aircraft airflow sensor probe according to claim 1 further comprising:
    at least one air pressure sensor configured to determine an air pressure received by an air pressure sensor port;
    wherein the air pressure comprises a static air pressure, an airflow velocity, and a pressure differential between an upper side of the airflow assembly and a lower side of the airflow assembly; and
    wherein the angle of attack processor is further configured to control the motor to generate the torque to damp the rotational movement of the shaft as well as the airflow assembly in response to the air pressure determined by the at least one air pressure sensor.

5. The aircraft airflow sensor probe according to claim 1 further comprising:
    at least one air pressure sensor configured to determine an air pressure received by an air pressure sensor port;
    wherein the air pressure comprises a pressure differential between an upper side of the airflow assembly and a lower side of the airflow assembly; and
    wherein the angle of attack processor is further configured to control the motor to generate the torque to damp the rotational movement of the shaft as well as the airflow assembly in response to the air pressure determined by the at least one air pressure sensor.

6. The aircraft airflow sensor probe according to claim 1 further comprising:
    at least one air pressure sensor configured to determine an air pressure received by an air pressure sensor port;
    wherein the air pressure comprises airflow velocity; and
    wherein the angle of attack processor is further configured to control the motor to generate the torque to damp the rotational movement of the shaft as well as the airflow assembly in response to the air pressure determined by the at least one air pressure sensor.

7. The aircraft airflow sensor probe according to claim 1 further comprising:
    at least one air pressure sensor configured to determine an air pressure received by an air pressure sensor port;
    wherein the air pressure comprises a static air pressure; and
    wherein the angle of attack processor is further configured to control the motor to generate the torque to damp the rotational movement of the shaft as well as the airflow assembly in response to the air pressure determined by the at least one air pressure sensor.

8. The aircraft airflow sensor probe according to claim 1:
wherein the sensor is further configured to sense the position of the airflow assembly and provide the position of the airflow assembly to the angle of attack processor; and
wherein the angle of attack processor is further configured to control the motor to generate the torque to damp the rotational movement of the shaft as well as the airflow assembly in response to the position of the airflow assembly.

9. The aircraft airflow sensor probe according to claim 1:
wherein the angle of attack processor is configured to receive an ambient temperature from a temperature sensor; and
wherein the angle of attack processor is further configured to control the motor to generate the torque to damp the rotational movement of the shaft as well as the airflow assembly in response to the ambient temperature.

10. An aircraft airflow sensor probe comprising:
an airflow assembly configured to sense a direction of local airflow outside an aircraft;
a shaft configured to rotatably hold the airflow assembly and allow rotational movement of the airflow assembly;
a motor connected to the shaft and configured to generate a torque to damp the rotational movement of the shaft as well as the airflow assembly;
an angle of attack processor configured to control the motor to generate the torque to damp the rotational movement of the shaft as well as the airflow assembly; and
a sensor configured to sense a position of the airflow assembly and provide the position of the airflow assembly to the angle of attack processor,
wherein the airflow assembly comprises one of the following: a vane assembly configured to sense a direction of local airflow outside an aircraft and a cone assembly configured to sense a direction of local airflow outside an aircraft;
wherein the angle of attack processor is configured to receive aircraft configuration data from the aircraft; and
wherein the angle of attack processor is further configured to control the motor to generate the torque to damp the rotational movement of the shaft as well as the airflow assembly in response to the aircraft configuration data.

11. A process of operating an aircraft airflow sensor probe comprising:
sensing a direction of local airflow outside an aircraft with an airflow assembly;
allowing rotational movement of the airflow assembly with a shaft configured to rotatably hold the airflow assembly;
generating a torque to damp the rotational movement of the shaft as well as the airflow assembly with a motor connected to the shaft;
controlling the motor to generate the torque to damp the rotational movement of the shaft as well as the airflow assembly with an angle of attack processor based on at least one of the following: a static air pressure, an airflow velocity, a pressure differential between an upper side of the airflow assembly and a lower side of the airflow assembly, a rate of change of a position of the airflow assembly, a position of the airflow assembly, or an ambient temperature; and
sensing a position of the airflow assembly and providing the position of the airflow assembly to the angle of attack processor with a sensor,
wherein the airflow assembly comprises one of the following: a vane assembly configured to sense a direction of local airflow outside an aircraft and a cone assembly configured to sense a direction of local airflow outside an aircraft.

12. The process of operating an aircraft airflow sensor probe according to claim 11 further comprising:
determining an air pressure received by an air pressure sensor port with at least one air pressure sensor;
wherein the air pressure comprises at least one of the following: a static air pressure, an airflow velocity, and a pressure differential between an upper side of the airflow assembly and a lower side of the airflow assembly; and
wherein the angle of attack processor is further configured to control the motor to generate the torque to damp the rotational movement of the shaft as well as the airflow assembly in response to the air pressure determined by the at least one air pressure sensor.

13. The process of operating an aircraft airflow sensor probe according to claim 11:
wherein the sensor is further configured to sense a rate of change of the position of the airflow assembly and provide the rate of change of the position of the airflow assembly to the angle of attack processor; and
wherein the angle of attack processor is further configured to control the motor to generate the torque to damp the rotational movement of the shaft as well as the airflow assembly in response to the rate of change of the position of the airflow assembly.

14. The process of operating an aircraft airflow sensor probe according to claim 11 further comprising:
determining an air pressure received by an air pressure sensor port with at least one air pressure sensor;
wherein the air pressure comprises a static air pressure, an airflow velocity, and a pressure differential between an upper side of the airflow assembly and a lower side of the airflow assembly; and
wherein the angle of attack processor is further configured to control the motor to generate the torque to damp the rotational movement of the shaft as well as the airflow assembly in response to the air pressure determined by the at least one air pressure sensor.

15. The process of operating an aircraft airflow sensor probe according to claim 11 further comprising:
determining an air pressure received by an air pressure sensor port with at least one air pressure sensor;
wherein the air pressure comprises a pressure differential between an upper side of the airflow assembly and a lower side of the airflow assembly; and
wherein the angle of attack processor is further configured to control the motor to generate the torque to damp the rotational movement of the shaft as well as the airflow assembly in response to the air pressure determined by the at least one air pressure sensor.

16. The process of operating an aircraft airflow sensor probe according to claim 11 further comprising:
determining an air pressure received by an air pressure sensor port with at least one air pressure sensor;
wherein the air pressure comprises airflow velocity; and
wherein the angle of attack processor is further configured to control the motor to generate the torque to damp the rotational movement of the shaft as well as the airflow assembly in response to the air pressure determined by the at least one air pressure sensor.

17. The process of operating an aircraft airflow sensor probe according to claim 11 further comprising:

determining an air pressure received by an air pressure sensor port with at least one air pressure sensor;

wherein the air pressure comprises a static air pressure; and wherein the angle of attack processor is further configured to control the motor to generate the torque to damp the rotational movement of the shaft as well as the airflow assembly in response to the air pressure determined by the at least one air pressure sensor.

18. The process of operating an aircraft airflow sensor probe according to claim 11:

wherein the sensor is further configured to sense the position of the airflow assembly and provide the position of the airflow assembly to the angle of attack processor; and wherein the angle of attack processor is further configured to control the motor to generate the torque to damp the rotational movement of the shaft as well as the airflow assembly in response to the position of the airflow assembly.

19. The process of operating an aircraft airflow sensor probe according to claim 11:

wherein the angle of attack processor is configured to receive an ambient temperature from a temperature sensor; and wherein the angle of attack processor is further configured to control the motor to generate the torque to damp the rotational movement of the shaft as well as the airflow assembly in response to the ambient temperature.

20. The process of operating an aircraft airflow sensor probe according to claim 11:

wherein the angle of attack processor is configured to receive aircraft configuration data from the aircraft; and wherein the angle of attack processor is further configured to control the motor to generate the torque to damp the rotational movement of the shaft as well as the airflow assembly in response to the aircraft configuration data.

* * * * *